US008818274B2

(12) United States Patent
Grob et al.

(10) Patent No.: US 8,818,274 B2
(45) Date of Patent: Aug. 26, 2014

(54) AUTOMATIC INTERFACING BETWEEN A MASTER DEVICE AND OBJECT DEVICE

(75) Inventors: Matthew S. Grob, La Jolla, CA (US); Serafin Diaz Spindola, San Diego, CA (US); Gerald V. Wright, Jr., Solana Beach, CA (US); Virginia Walker Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 12/786,886

(22) Filed: May 25, 2010

(65) Prior Publication Data

US 2011/0016405 A1 Jan. 20, 2011

Related U.S. Application Data

(60) Provisional application No. 61/226,552, filed on Jul. 17, 2009, provisional application No. 61/226,545, filed on Jul. 17, 2009.

(51) Int. Cl.
*H04B 7/00* (2006.01)
*H04N 1/00* (2006.01)
*H04L 29/06* (2006.01)

(52) U.S. Cl.
CPC .... *H04N 1/00127* (2013.01); *H04N 2201/0055* (2013.01); *H04N 1/0044* (2013.01); *H04N 2201/0013* (2013.01); *H04N 1/00307* (2013.01); *H04N 1/00408* (2013.01); *H04N 2201/0084* (2013.01); *H04L 63/083* (2013.01)
USPC ...................................................... 455/41.2

(58) Field of Classification Search
USPC ...................................................... 455/41.2
See application file for complete search history.

(56) References Cited

U.S. PATENT DOCUMENTS 6,037,936 A * 3/2000 Ellenby et al. ................ 715/764
6,353,450 B1 * 3/2002 DeLeeuw ...................... 715/768
6,396,475 B1 * 5/2002 Ellenby et al. ................ 345/156

(Continued)

FOREIGN PATENT DOCUMENTS

EP 1447944 A2 8/2004
EP 1571584 A1 9/2005

(Continued)

OTHER PUBLICATIONS

International Search Report and Written Opinion—PCT/US2010/042318, International Search Authority—European Patent Office—Mar. 11, 2011.

(Continued)

*Primary Examiner* — David Bilodeau
(74) *Attorney, Agent, or Firm* — Jennifer M. Pascua

(57) ABSTRACT

A master device images an object device and uses the image to identify the object device. The master device then automatically interfaces with the identified object device, for example, by pairing with the object device. The master device may receive broadcast data from the object device including information about the visual appearance of the object device and use the broadcast data in the identification of the object device. The master device may retrieve data related to the object device and display the related data, which may be display the data over the displayed image of the object device. The master device may provide an interface to control the object device or be used to pass data to the object device.

36 Claims, 9 Drawing Sheets

(56) References Cited

U.S. PATENT DOCUMENTS

| | | | |
|---|---|---|---|
| 2002/0190128 A1* | 12/2002 | Levine et al. | 235/462.13 |
| 2004/0162027 A1* | 8/2004 | Chang | 455/41.2 |
| 2004/0208372 A1* | 10/2004 | Boncyk et al. | 382/181 |
| 2005/0234977 A1* | 10/2005 | Goerick et al. | 707/103 R |
| 2006/0161379 A1 | 7/2006 | Ellenby et al. | |
| 2006/0190812 A1 | 8/2006 | Ellenby et al. | |
| 2008/0125040 A1* | 5/2008 | Kalayjian | 455/41.2 |
| 2009/0034591 A1 | 2/2009 | Julian et al. | |
| 2009/0086042 A1 | 4/2009 | Vartiainen et al. | |
| 2009/0156123 A1* | 6/2009 | Kim | 455/41.2 |
| 2009/0176451 A1* | 7/2009 | Yang et al. | 455/41.2 |
| 2009/0196510 A1 | 8/2009 | Gokturk et al. | |

FOREIGN PATENT DOCUMENTS

| | | |
|---|---|---|
| JP | 2005251197 A | 9/2005 |
| JP | 2005268941 A | 9/2005 |
| JP | 2006081028 A | 3/2006 |
| JP | 2009146085 A | 7/2009 |
| WO | WO03041000 A1 | 5/2003 |
| WO | 2009046574 A1 | 4/2009 |

OTHER PUBLICATIONS

Valkkynen, Pasi et al., "A user interaction paradigm for physical browsing and near-object control based on tags", in Proc. Physical Interaction Workshop on Real World User Interaction Workshop on Real World User Interfaces, (2003), 31-34.

Anokwa, Yaw, "Beyond Device Pairing: New Interactions on NFC Enabled Mobile Phones", Department of Computer Science and Engineering, Univ. Wash. (2007), 5 pages.

European Search Report—EP12007994—Search Authority—Hague—May 3, 2013.

Taiwan Search Report—TW099123691—TIPO—May 7, 2013.

European Search Report—EP12007994—Search Authority—The Hague—Nov. 11, 2013.

* cited by examiner

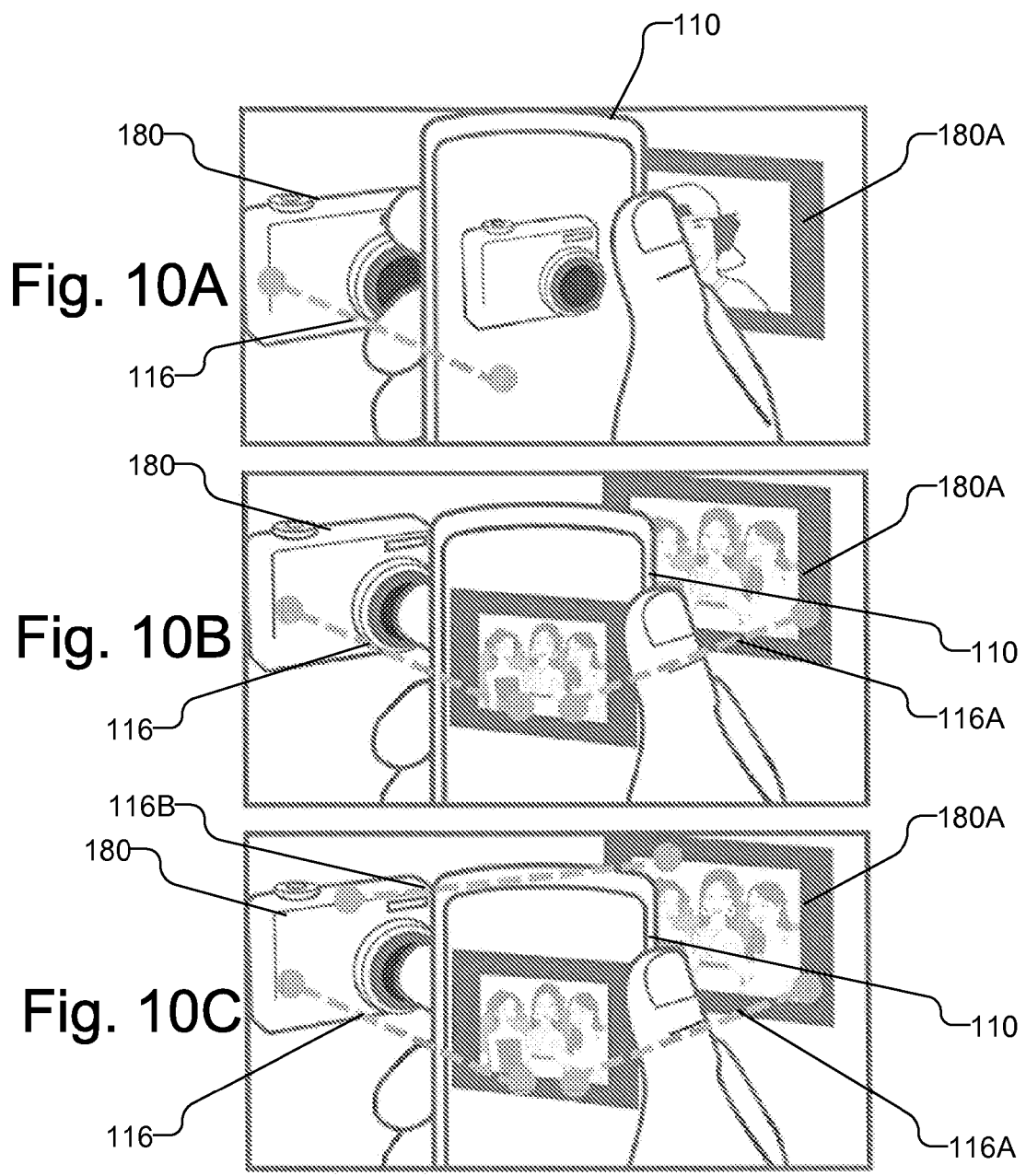

AUTOMATIC INTERFACING BETWEEN A MASTER DEVICE AND OBJECT DEVICE

CROSS REFERENCE TO RELATED APPLICATIONS

This application claims the benefit of Provisional Application No. 61/226,552, filed Jul. 17, 2009 and Provisional Application No. 61/226,545, filed Jul. 17, 2009 which are assigned to the assignee hereof and hereby expressly incorporated by reference herein.

BACKGROUND

Wireless devices are becoming more ubiquitous. Interfacing with wireless devices is currently a relatively difficult or limited process. For example, pairing electronic devices is currently a complex task, requiring the user to turn on protocols on both devices, then requesting discovery, then pairing. Further, some electronic devices have little or no built in interfaces, making them difficult to interact with. The price of display screens and the small device sizes that are generally desired are barriers to putting rich interfaces on every wireless device.

As the use of wireless devices increases, interfacing between electronic devices will become more difficult. For example, currently electronic devices typically include indistinct device names having no association to the physical device and are confusing to users, e.g., a default phone Bluetooth name may be NOK234B and does not appear on the phone. The confusion suffered by users will be compounded by the increasing number of wireless devices to which pairing is possible.

Thus, there is an increasing demand to easily and naturally interface with devices.

SUMMARY

A master device images an object device and uses the image to identify the object device. The master device then automatically interfaces with the identified object device, for example, by pairing with the object device. The master device may retrieve data related to the object device and display the related data, which may be display the data over the displayed image of the object device. The master device may provide an interface to control the object device or be used to pass data to the object device.

The master device receives broadcast data from an object device, which includes information about the visual appearance of the object device. The master device may display the broadcast data and interfaces with the object device based on a selection of the displayed broadcast data from the object device. An image of the object device may be used to filter broadcast data from multiple object devices to reduce the number of object devices whose broadcast data is displayed by the master device.

BRIEF DESCRIPTION OF THE DRAWING

FIGS. 10A, 10B, and 10C illustrate a master device used to initiate an interface between two object devices.

DETAILED DESCRIPTION

A system and method described herein automates pairing or otherwise interfacing a master device and an object device using, e.g., an image of the object device taken with the master device. The master device may be used to provide relevant information related to the object device, e.g., by overlaying the information on the image of the object device. The master device may include interaction capabilities that are superior to that found in the object device and can enable interactions with the object device that are otherwise difficult or not possible, e.g., due to the limited or no interfacing capabilities of the object device.

Figure 1:
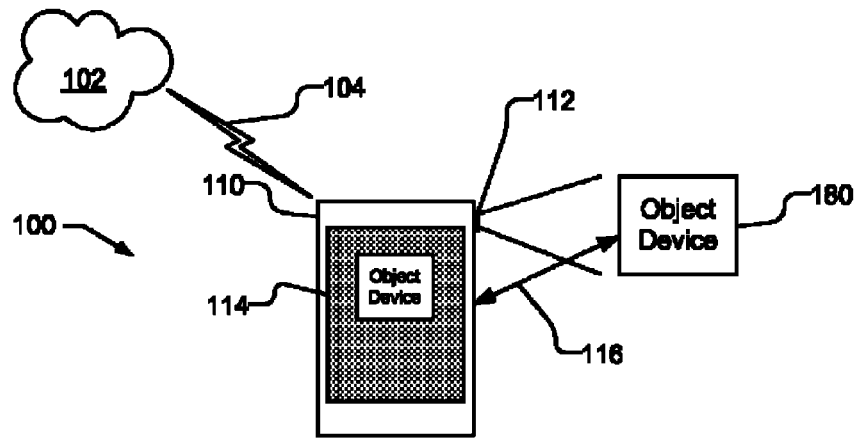
FIG. 1 is a block diagram illustrating an example system of wirelessly connected devices, including a master device and an object device.

FIG. 1 is a block diagram illustrating an example system 100 of wirelessly connected devices, including a master device 110 and an object device 180. By way of example, the master device 110 may be a mobile phone or other electronic devices, such as an Ultra-Mobile PC ("UMPC"). In one embodiment, the master device 110 may be semi-mobile or stationary. For example, the master device 110 may be located at a fixed or semi-fixed location, e.g., in a store, that may be used to easily pair new devices together. By way of example, the object device may be a device such as a digital camera, music player, television, digital picture frame, or any other device. In addition, it should be appreciated that the object device 180 may be portable or, in some cases, relatively or completely non-portable. The master device 110 includes a camera 112 and a display 114. The master device 110 interfaces with the object device 180 by imaging the object device 180 using the camera 112, the image 180image of the object device 180 may be shown in the display 114, and using the image 180image to identify the object device 180. With the object device 180 identified, the master device 110 can then automatically interface with the object device 180, as illustrated by arrow 116. The master device 110 may also communicate with a network 102, e.g., a wide area network such as the Internet), over a link 104, which may be used to assist in identifying or interfacing with the object device 180. Optionally, the master device 110 may interface 116a with object device 180 indirectly through the network 102.

Figure 2:
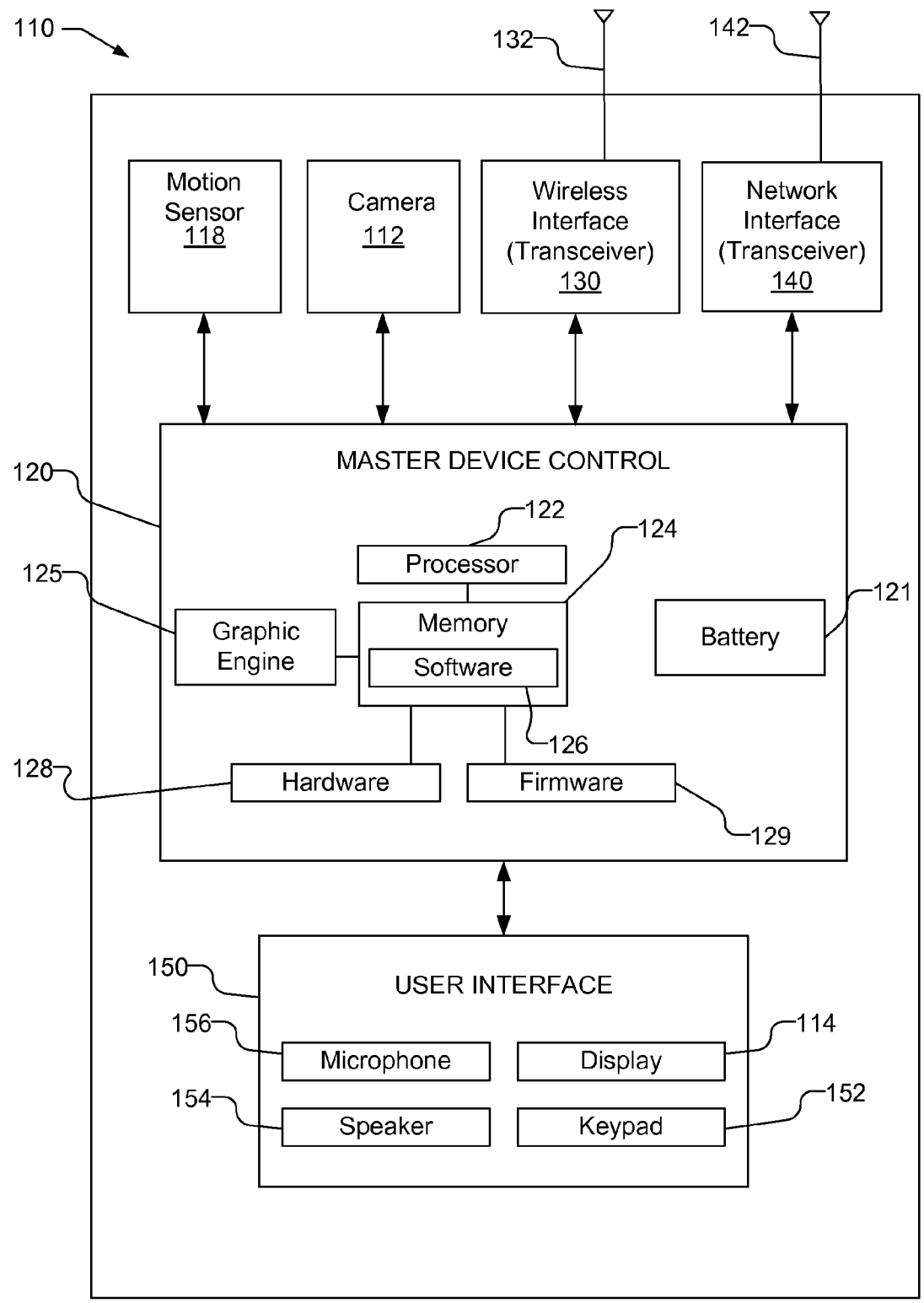
FIG. 2 is a block diagram illustrating an example of a master device that may automatically interface with an object device.

FIG. 2 is a block diagram illustrating an example of a master device 110. The master device 110 includes a means for imaging, such as a camera 112, and a means for interfacing with an object device, such as a wireless interface 130 for communicating via the wireless link 116 (shown in FIG. 1). The master device 110 may also include a means for sensing motion, such as motion sensors 118, which may be accelerometers or gyroscopes, to detect motion of the master device 110, which may be used to detect gestures used as a user input for the master device 110. The master device 110 further includes a means to identify an object device 180, which may, e.g., a master device control unit 120, which includes a processor 122 that is in communication with memory 124, which includes software 126, and may further include hardware 128 and firmware 129, and may further include aspects of a user interface 150, such as the display or keypad 152. The camera 112 and wireless interface 130, and motion sensors 118 if used, are connected to the control unit 120. The control unit 120 includes a graphic engine 125, which is illustrated as functionally separate from the processor 122, but in fact may be performed by the processor 122. The graphic engine 125 generates augmentation data that may be displayed over the image of, e.g., the object device 180. It will be understood as used herein that the processor can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The master device 110 also includes a user interface 150, which includes a means for displaying, such as the display 114, as well as a user input device 152, such as a keypad, touch screen, or other suitable tactile input device. The user interface 150 may also include a speaker 154 and a microphone 156, such as when the master device 110 is a mobile phone.

The wireless interface 130 includes any suitable antenna 132, a receiver and transmitter or a transceiver so that the master device 110 can communicate with one or more object devices over the wireless link 116. Optionally, the wireless interface 130 may also have processing capabilities to reduce processing requirements of the processor 122.

Optionally, the master device 110 may include a network interface 140, such as a transceiver, with an antenna 142 to communicate over the network 102 via a link 104 (shown in FIG. 1). For example, the master device 110 may provide connectivity to the other network 102 (e.g., a wide area network such as the Internet) via a wired or wireless communication link. Accordingly, the master device 110 may enable other object devices 180 (e.g., a Wi-Fi station) to access the network 102. The network interface 140 may be implemented in conjunction with various wireless communication networks, including cellular towers and from wireless communication access points, such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The master device 110 may optionally include a battery 121 to provide power to one or more components of the master device 110. The master device 110 may comprise at least one of a mobile handset, a personal digital assistant, a laptop computer, a headset, a vehicle hands free device, or any other electronic device. In particular, the teachings herein may be incorporated into (e.g., implemented within or performed by) a variety of the devices. For example, one or more aspects taught herein may be incorporated into a phone (e.g., a cellular phone), a personal data assistant ("PDA"), UMPC, an entertainment device (e.g., a music or video device), or any other device that incorporates a camera 112.

The methodologies described herein may be implemented by various means depending upon the application. For example, these methodologies may be implemented in hardware 128, software 126, firmware 129, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

For example, software 126 codes may be stored in memory 124 and executed by the processor 122 and may be used to run the processor and to control the operation of the master device 110 as described herein. For example, a program code stored in a computer-readable medium, such as memory 124, may include program code to identify an object device using an image of the object device and program code to interface with the identified object device. The computer-readable medium may include program code to display broadcast data received from an object device and to use the broadcast data to assist in identifying the object device to be interfaced with.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 3:
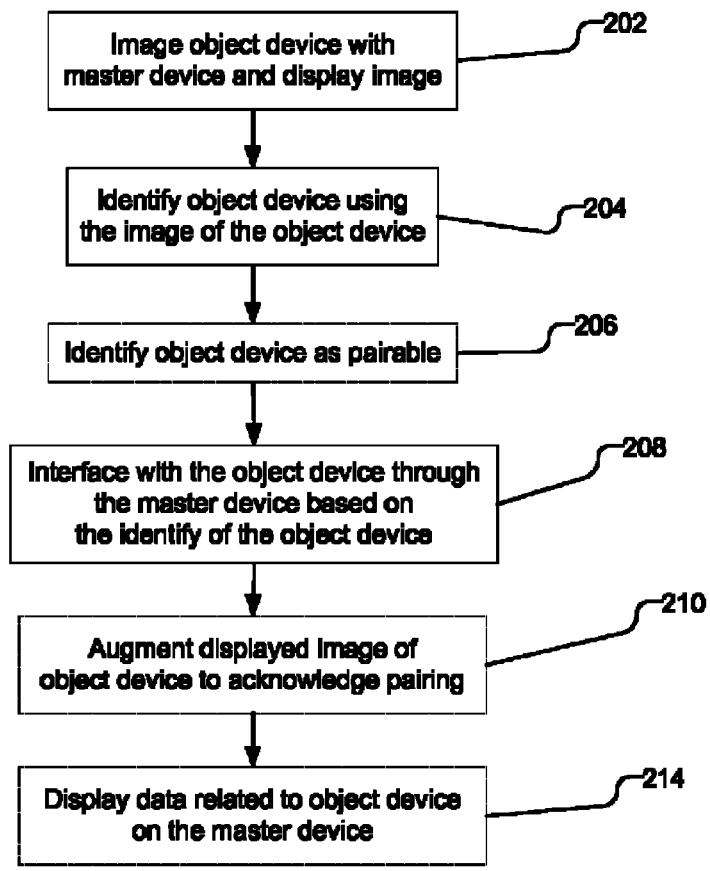
FIG. 3 is a flow chart of the method of interfacing the master device with the object device.

FIG. 3 is a flow chart of the method of interfacing the master device 110 with the object device 180. The master device 110 may interface with the object device by "pairing", which is a process by which devices register with each other. Once paired, devices typically can communicate with each other whenever they are within range and active without re-performing the pairing process. For ease of reference, interfacing is sometimes referred to herein as pairing, but it should be understood that additional forms of interfacing, other than pairing, are also contemplated herein.

As illustrated in FIG. 3, the object device to be paired with is imaged using the master device (202). The image of the object device may be displayed to the user to ensure that the master device is interfacing with the desired object device. The image may be produced as a still image using the camera or as video. The master device identifies the object device from the image (204). Identification may be based on the visual appearance of the object device or based on a visible marker appearing on the object device, such as a bar code or other type of mark. Identification may be further based on a broadcast beacon. e.g., based on a tag or frequency, from the object device 180, which, e.g., allows public access to limited information, such as geo-position, geo-orientation. ID, or a category such as, but not limited to the type of the object device (e.g., digital camera, mp3 player, etc.), sub-category (e.g., point-and-shoot digital camera), brand (e.g., Sony, Nokia, etc.), genre of content (e.g., movie, song, etc.), or any combination thereof. The master device 110 may identify the object device 180 by retrieving a match from a look-up table using the visual appearance, the visible marker, or information obtained from the broadcast beacon. In one embodiment, the master device 110 may use available non-visual sensors to narrow the look-up table of likely items, followed by performing a visual matching of the image against the look-up table using keypoint features or other visual references, such as lines. The look-up table, for example may include previously stored images of consumer electronics industrial designs or 3-dimensional models of such designs. The look-up table maybe stored, e.g., on the master device 110, on the object device 180 or at a remote location, e.g., on a server accessed by network 102 via link 104 (shown in FIG. 1).

Figure 9A:
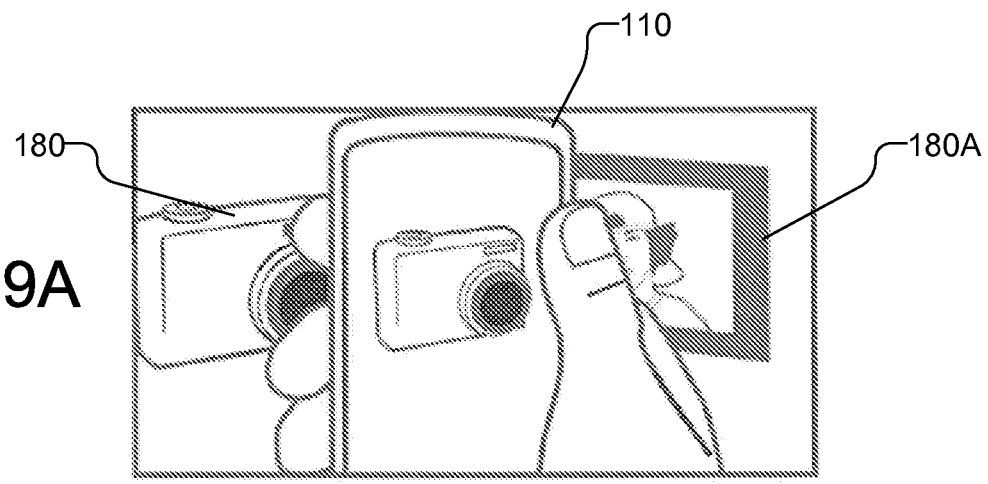
FIGS. 9A, 9B, and 9C illustrate a master device used to interface with two object devices.

In one embodiment, identification may be based on visual identification information provided by the object device. For example, the object device may broadcast visual information about the object device with which the object device may be identified. The object device may broadcast what the object device looks like or the image or information about an image displayed by the object device, e.g., when the object device is a digital picture frame as illustrated in FIG. 9A, which may be useful when identical object devices are present. The master device 110 can then image the object devices and compare the image taken by the master device 110 with the broadcast information about the object devices, e.g., the currently displayed image on the digital picture frame, to identify the object device. For example, as illustrated in FIG. 9A, the master device 110 can use the industrial design of digital frame 180A to recognize that object device. However, if there were multiple similar or identical frames, e.g., same industrial design, but each displays a different screen image, the user could select one (180A) in the camera view and master device 110 could identify which of the objects devices to pair with using the currently displayed image. Identification can be based on a displayed still image, e.g., as with a digital picture frame, or based on a displayed video. For identification based on a video, the match may be made, e.g., based on a sequence of shared video signatures, which are summaries of what a video "looks like" in a predetermined time segment, or based on one frame of the video that is produced at a known time with the addition of an error correction in which a selected number for frames on either side of the selected frame are compared as well. These techniques may be used with other object devices, such as computers, laptops, cellular telephones, music players, etc. In one embodiment, the master device 110 may display an image of the information broadcast by the object device, from which the user may select the desired object device to interface with, which would obviate the need for the master device 110 to image the object device with the master device 110. If desired, an image of the object device taken by the master device 110 may be used to filter the number of pairable object devices that the master device 110 displays for user selection.

Based on the identification of the object device, the master device may determine if the object device may be interfaced with, as illustrated in optional step 206. The master device 110 may indicate on the image of the object device 180 in the display 114 whether the object device 180 may be interfaced with and give the user an opportunity to indicate whether interfacing is desired. For example, the image of the object device 180 may be shown outlined or glowing in the display 114 of the master device 110 to indicate pair-ability. The augmentation of the display of the object device image may include information obtained from the broadcast beacon from the object device 180. The user can choose to pair, to not pair, or to hide pair-ability of the object device. The pair-ability may be hidden, e.g., once, for all time, or for all object devices within a specific class, e.g., all digital picture frames.

The master device 110 may then interface or pair with the object device (208) automatically or in response to the user selection. The use of user selection may be advantageous when more than one pairable object device is present in the image. By way of example, the user selection may be based on gestures, e.g., where different pairable object devices are highlighted based on gestures, and the desired object device is selected once it is highlighted. Additionally, the user may, for example, indicate that pairing is desired, and the pairing process may be automatic. Where pairing is automatic an intermediate security step may be used to ensure that the user desires pairing with the object device. The pairing may be optimized for specific devices in specific locations, e.g., using the lowest power pairing method to reach the distance between the master device and the object device. Further, the pairing method may change automatically as needed if the relative positions of the master device and object device change. In order to interface or pair, the master device and object device must first discover each other, for example, by entering a discoverable state in which devices discover each other through the exchange of discovery messages. For example, master device 110 may request that local pairable object devices enter discovery mode. The master device 110 may initiate the request, e.g., through network 102. The network may stimulate any pairable object device in the area of master device 110 to enter discovery mode. Alternatively, the master device may first identify the desired object device 180, then initiate the discovery request, e.g., through network 102, for all similar object devices in the area of master device 110 to enter into discover mode. Upon discovery, devices may pair with each other. Pairing is at least partly a security function to limit pairing to particular devices. For example, pairing may include an exchange of messages that may include password authentication schemes in which a first device must respond with a password (such as a four digit number, which is often fixed at the factory for a device) to a second device to prevent unauthorized or undesired pairing of devices. In networking protocols such as Bluetooth, discovery and pairing are separate procedures, but may be performed together. The actual pairing can be done with any current protocol through the protocol's standard practice (e.g. Bluetooth, WiFi, IR . . . ).

If desired, the image displayed on the master device 110 may be augmented to indicate the status of the object device, e.g., acknowledge pairing as indicated in optional step 210, using e.g., augmentation data provided by the graphic engine 125. Additionally, data related to the object device may be displayed on the master device in optional step 214.

Figure 4A:
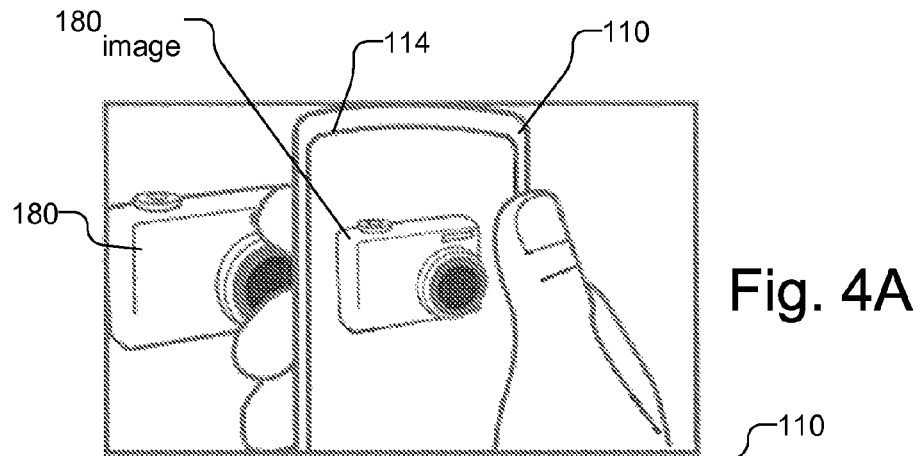
FIGS. 4A and 4B illustrate a master device interfacing with an object device with data related to the object device displayed on the master device.
Figure 4B:
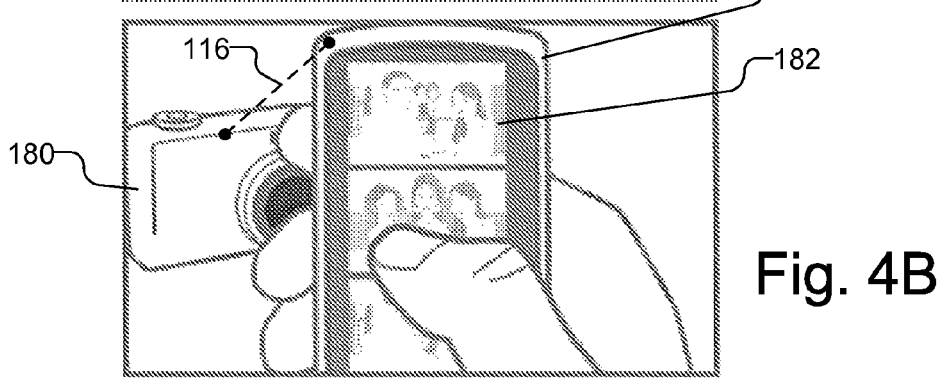

FIGS. 4A and 4B, by way of example, illustrate pairing a master device 110 with an object device 180, in this case a digital camera, where data related to the object device 180 is displayed on the master device 110 after pairing (214). FIG. 4A illustrates the master device 110 imaging the object device 180 (202) where the object device linage $18_{image}$ is shown in the display 114 of the master device 110. Based on the object device image $180_{image}$, the master device 110 pairs 116 with the object device 180 and displays data related to the object device 180, in this case, photos 182 taken by the object device 180, on the display 114 of the master device 110, as illustrated in FIG. 4B. The data related to the object device 180 that is displayed by the master device 110 may be selected by the user or may be automatically displayed.

Figures 5A, 5B:
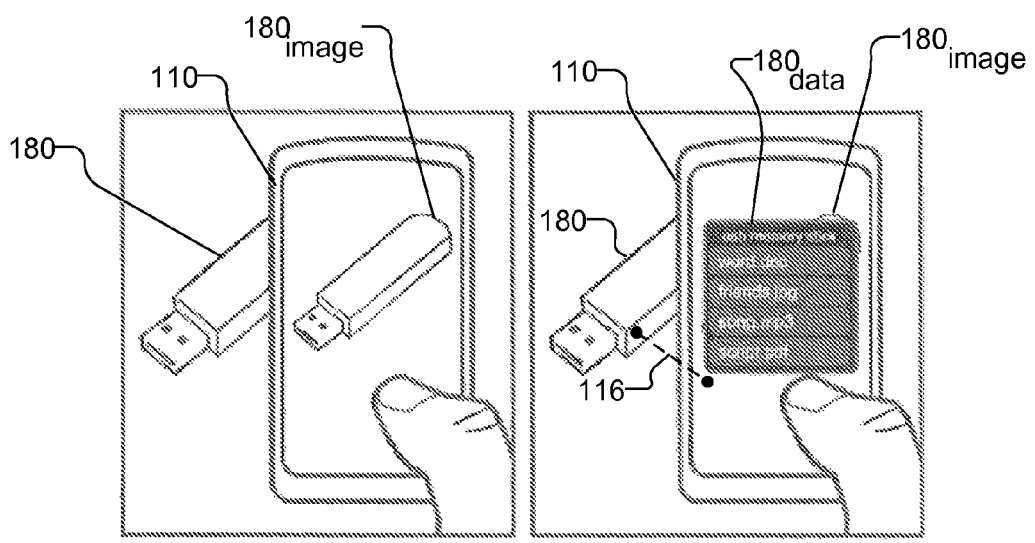
FIGS. 5A and 5B illustrate a master device interfacing with an object device and the display of the master device augmented with the data related to the object device.

The data related to the object device 180 may be information about the object device. For example, the data may be related to the history or properties of the object device, help files describing how to perform tasks related to the object device or other such data. Alternatively, the related data may be from the object device, such as photos from a digital camera, a list of files, such as music or movies, or other information stored in the object device. Additionally, the related data may be an application or an interface with the object device. By way of example, FIGS. 5A and 5B illustrate a master device 110 interfacing with an object device 180 in the form of a USB flash drive, and the display of the master device 110 augmented with the data $180_{data}$ related to the object device 180. As illustrated in FIG. 5B, after pairing 116 the related data $180_{data}$, which may be a list of files stored on the flash drive or even open the files stored on the flash drive, is displayed. Thus, the master device 110 may provide a user interface for the object device 180 when the object device 180 itself does not have a user interface.

Figures 6A, 6B, 6C, 6D:
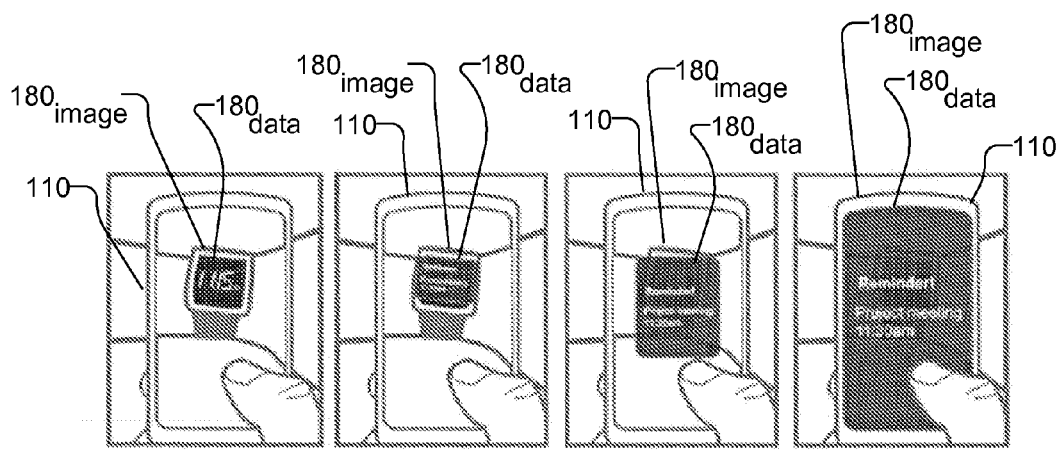
FIGS. 6A, 6B, 6C, and 6D illustrate a master device interfacing with an object device with augmented data related to the object device shown on the master device over the object device image.

FIGS. 6A, 6B, 6C, and 6D illustrate another example of a master device 110 interfacing with an object device 180 in the form of a watch, with augmented data $180_{data}$ relative to the object device 180 shown on the master device 110 over the object device image $180_{image}$. As illustrated, the related data $180_{data}$ may be displayed by the master device 110 as tightly aligned (FIG. 6A), loosely aligned (FIG. 6B), or not aligned (FIGS. 6C, 6D) with the object device image $180_{image}$. As illustrated in FIG. 6D, the related data from the object device 180 may be displayed over the entire display of the master device 180, using key point tracking of the image $180_{image}$, then locking the graphic augmentation to it.

Figures 7A, 7B:
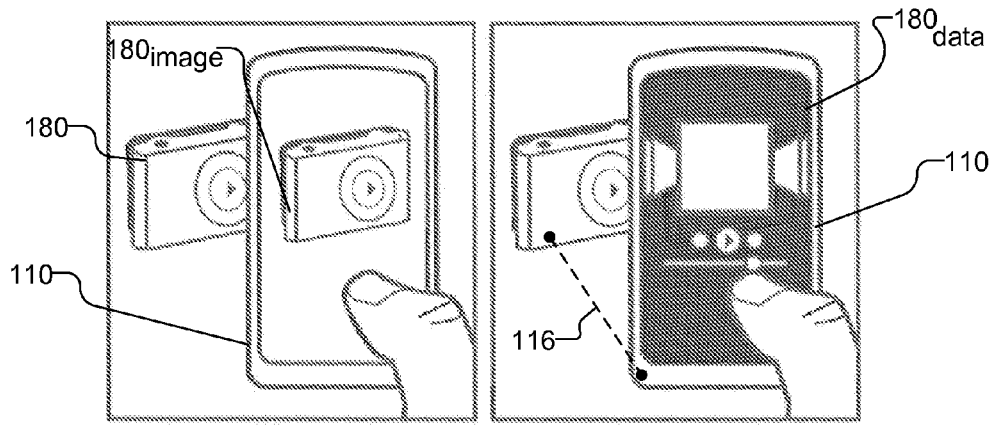
FIGS. 7A and 7B illustrate a master device interfacing with an object device that has limited interface capabilities.

The master device 110 may be used to provide a user interface with an object device that has limited user interface capabilities or to simply provide a user interface with expanded functionality relative to that permitted by the user interface of the object device. For example, FIGS. 7A and 7B illustrate a master device 110 pairing with an object device 180 that has limited user interface capabilities. The object device 180 in FIGS. 7A and 7B is in the form of a MP3 player, which may have a physical user interface but no screen to provide a graphical user interface (GUI). As shown in FIG. 7A, the master device 110 is paired with the object device 180 by imaging the object device 180. As shown in FIG. 7B, after pairing 116 the data related to the object device 180 on the master device 110 is a GUI that can be used, e.g., to allow additional functionality of the MP3 player.

Figures 8A, 8B:
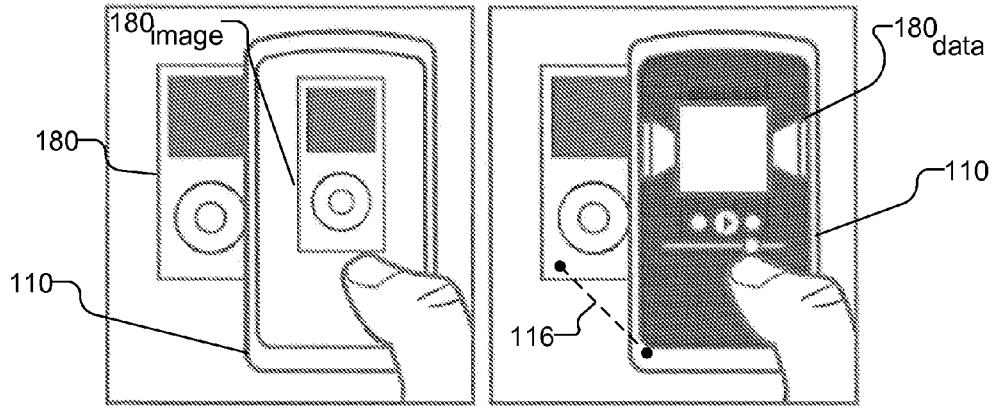
FIGS. 8A and 8B illustrate a master device interfacing with an object device where the master device provides expanded functionality for the object device.

FIGS. 8A and 8B illustrate a master device 110 interfacing with an object device 180 where the master device 110 provides expanded functionality. The object device 180 in FIGS. 8A and 8B is in the form of an mp3 player, which has a graphical user interface. As shown in FIG. 8A, the master device 110 is paired with the object device 180 by imaging the object device 180. As shown in FIG. 8B, after pairing 116 the data related to the object device 180 on the master device 110 is a GUI and the interface provides expanded functionality, such as a touch screen for easier user interaction, bigger screen, permitting more natural gestures for control or providing additional abilities, such as creating playlists.

Thus, various types of data related to the object device 180 may be displayed by the master device 110. For example, the data may be passive, such as the information illustrated in FIG. 6A, or interactive such as the music interface displayed in FIG. 7B. Further, functionality exposed by the object device either directly or through a remote source, such as network 102 shown in FIG. 1, may be displayed. By way of example, in FIGS. 5A, 5B, the $180_{data}$ may come from the network 102, as opposed to from the object device 180 itself. As an example, when the USB flash drive 180 shown in FIG. 5A is plugged into a computer, the $180_{data}$ may be synced in the network 102. When master device 110 pairs with the USB flash drive 180, it may actually pair with the synced data in the network 102. In another example, MP3 player functionality being extended, where a copy of the data on the MP3 player is on network 102. As the expanded functionality (e.g. making a play list) may not be possible on the MP3 player itself, master device 110 may be used to manipulate the data on network 102. Once the interaction is compete (e.g. new play list is made), the network 102 syncs with the MP3 player (object device) 180. If desired, the interaction between the master device 110 and the object device 180 may be persistent between augmentation calls. For example, the augmented data that is displayed may be held in the same state that it appeared the previous time it was viewed. Further, the master device 110 may provide commands or data to the object device 180. In other words, the object device 180 may be controlled through the interface with the master device 110. The data may be stored on the master device 110, the object device 180 or at a remote location, e.g., a server accessed via the network 102 (FIG. 1).

Figure 9B:
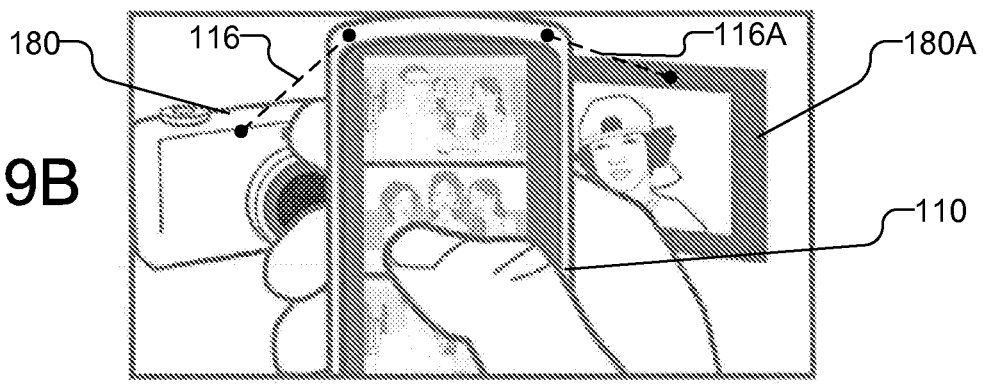
Figure 9C:
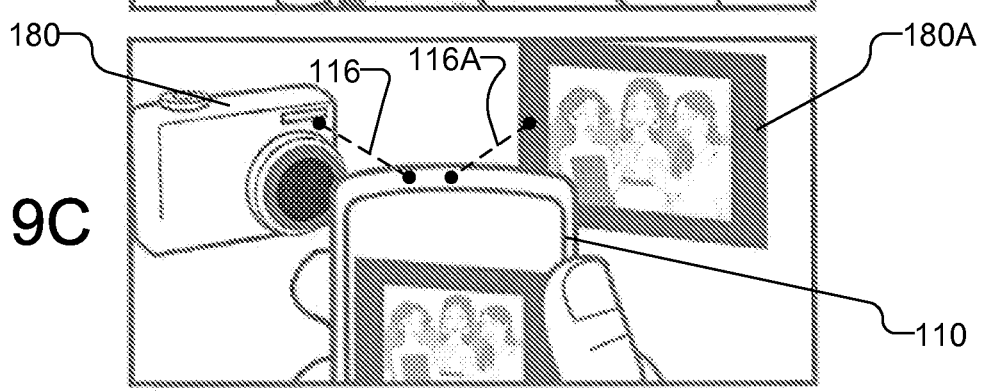

Additionally, the master device 110 may also interface with multiple object devices. For example, as illustrated in FIGS. 9A, 9B, and 9C, a master device 110 is used to interface with two object devices, illustrated as digital camera 180 and a digital picture frame 180A. The master device 110 may be used to retrieve data from one object device, e.g., camera 180, and to pass the data to the other object device, e.g., the digital picture frame 180A. FIG. 9A illustrates the master device 110 being paired with the camera 180 by imaging the camera 180. The digital picture frame 180A may be already or subsequently paired 116A, shown in FIG. 9B, in a similar manner. FIG. 9B illustrates after pairing 116 between master device 110 and the camera 180, data is received from the camera 180 by the master device 110 and displayed by the master device 110. Selected data may then be passed from the master device 110 to the second object device, e.g., the digital picture frame 180A, and may be displayed as shown in FIG. 9C or otherwise stored or used by the second object device. The data pass may be automatic or caused by user interaction, including selection through a touch screen or a user gesture detected by motion sensors 118, such as accelerometers or gyroscopes, in the master device 110. For the use of a gesture to initiate a data pass, the relative locations of one or more of the object devices 180, 180A with respect to each other and/or the master device 110 may be previously determined, e.g., by detecting the change in position or orientation of the master device 110 using the motion sensors 118 between imaging of the two object devices 180, 180A. Alternatively, pixel flow tracking may be used to visually determine the relevance between the object devices 180, 180A.

In one embodiment, the master device 110 may be used to assist in the pairing between two or more object devices by interfacing with the object devices and initiating the pairing between the object devices, which may be particularly useful when the user interfaces of the object devices makes direct pairing of those devices difficult. For example, as illustrated in FIGS. 10A, 10B, and 10C, a master device 110 is used to initiate an interface between two object devices, illustrated as digital camera 180 and a digital picture frame 180A. FIG. 10A illustrates the master device 110 being paired 116 with the camera 180 by imaging the camera 180. FIG. 10B shows the master device 110 being paired 116A with a target object device, illustrated as a digital picture frame 180A by imaging the digital picture frame 180A. With the two object devices 180, 180A paired with the master device 110, the master device 110 may be used to initiate the pairing 116E between the two object devices 180, 180A as illustrated in FIG. 10C. The pairing of the two object devices 180, 180A may be made automatically, or in response to user interaction, such as selection through the user interface of the master device 110, by a gesture between the object devices 180, 180A where the master device 110 is aware of the relative locations of the object devices 180, 180A or by using protocol specifications from each object device 180, 180A. The pairing 186 between the object devices 180, 180A may persist in the absence of the master device 110.

Figure 11:
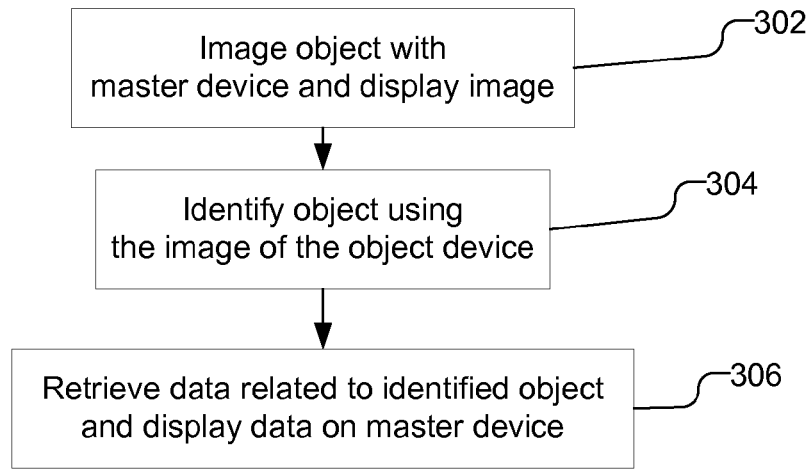
FIG. 11 is a flow chart of the method with which the master device may image a passive object with which it is not possible to pair or interface and the master device retrieving and displaying data related to the object.

In another embodiment, as illustrated in the flow chart shown in FIG. 11, the master device 110 may image a passive object 190 (302), i.e., an object that is not capable of being paired or otherwise interfaced with, and retrieve and display data related to the object. The master device 110 may identify the passive object (304) and retrieve data related to the identified object and display the data on the master device 110 (306). The passive object 190 may be any object that can be registered by the camera 112 of the master device 110, including devices without connectivity, such a watch, stapler, or car; devices with connectivity that is not utilized, e.g., a camera with Bluetooth; objects such as a pencil, rock or table; printed or digital media, such as magazine, screen-shot; body parts, such a wrist or foot; or other registered object, such as a color or texture.

The passive object 190 may be identified from its visual appearance. The identification may be based on specific images of the passive object, e.g., that were previously taken by the user, a textured 3-dimensional model of the passive object, or a general category of images, such as a general image of a watch, as opposed to a specific brand of watch. The user may provide additional information to define the image, such as labeling the image as "watch", or providing a PIN for specific objects or category of objects. The additional information provided by the user may be entered once, e.g., during training of the master device 110, and subsequent identification using the entered information is automatic. Additionally, the passive object may include a visual marker that is imaged and used to narrow the identification search e.g., by category, sub-category, brand, genre or any combination thereof. The identification may be performed by the master device 110 or remotely, e.g., through network 102 (FIG. 1). The image displayed on the master device 110 of the passive object may show that the passive object has been identified using augmentation to the image, e.g., by making the passive object glow or outlining the passive object. If desired, the user may select the passive object to be identified and the type of data to be displayed. The data may be displayed automatically. Selection of the passive object to be identified may be performed once by the user, and subsequent imaging of the passive object leads to automatic identification. The relation between the passive object and the retrieved data may be user defined or defined externally or automatically. Further, the data may be stored on the master device 110 or on a remote source and retrieved by the master device 110, e.g., on network 102 (FIG. 1). The related data may be in the form of an application that launches, such as a calendar application. Alternatively, an application may be retrieved or unlocked based on the image of the passive object. The related data may be information relevant to the passive object, such as instructions or help information. The related data may provide access to or start downloading of the related data based on the image of the passive object. For example, imaging a book cover may automatically download the audio book or digital book. The related data may be any media or combination of media and may include, but is not limited to two-dimensional or three-dimensional images, animation, video, sound, haptic feedback, or other sensory data.

Figure 12:
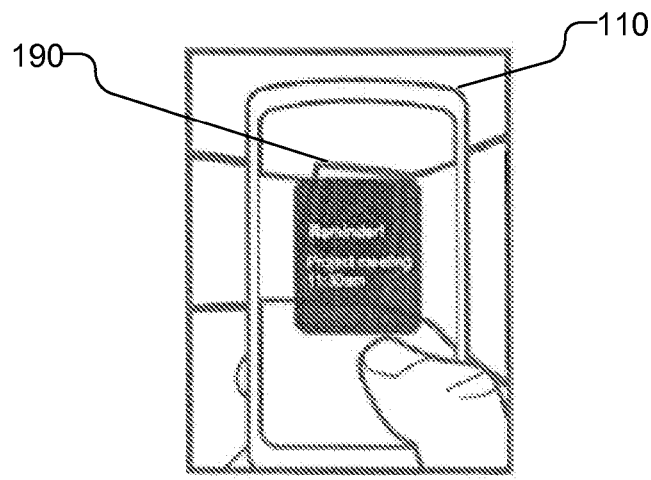
FIG. 12 illustrates a master device automatically launching and displaying an application based on the image of an object.

By way of example, the user may define within the master device 110 that an image of the user's watch 190 automatically launches a calendar application and displays the user's calendar on the master device 110, as illustrated in FIG. 12. Alternatively, the user may personalize relations between a passive object and the retrieved data, such as using an image of the user's wedding ring to open images of the user's wedding. The master device 110 may be trained to identify a personal passive object, such as a user's watch, ring, stapler, car etc. through a process including imaging the passive object and entering the device name and desired data to be related to the passive object, which is then correlated with the passive object by the master device 110.

Figures 13A, 13B:
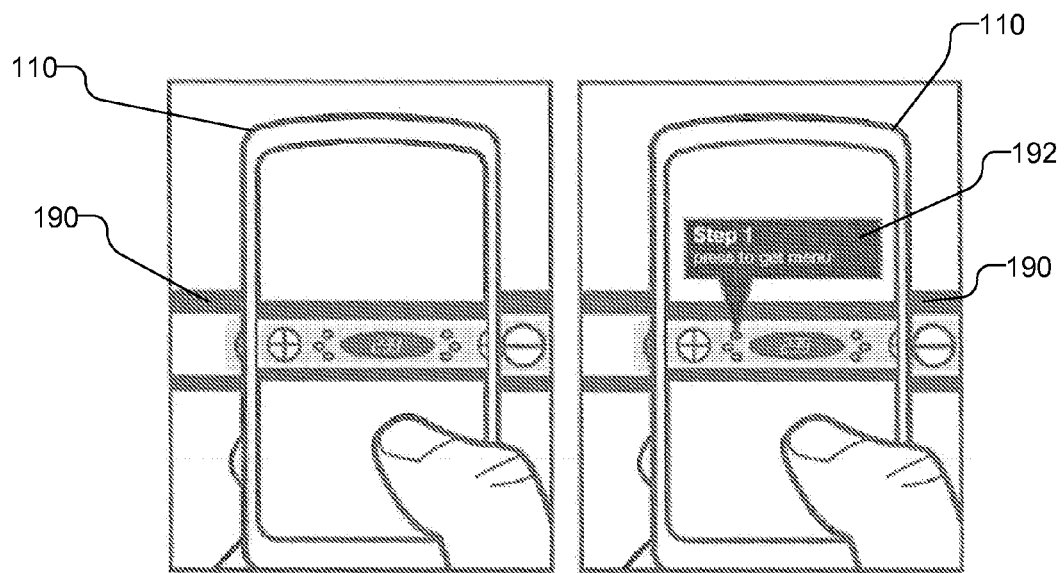
FIGS. 13A and 13B illustrate the master device imaging a passive object and retrieving and displaying information about the passive object.

Additionally, the related data that is retrieved for a passive object 190 may be externally or automatically defined. For example, FIGS. 13A and 13B illustrate an example where the master device 110 images a passive object 190 (FIG. 13A), such as a non-pairable DVR, and related data in the form of operation instructions 192, such as operations instructions, are retrieved from network 102, and automatically displayed by the master device 110 (FIG. 13B). The specific DVR is identified, but no connection or pairing is necessary to obtain the operation instructions, or other information for the specific DVR, from network 102. The operation instructions 192 may be displayed tightly aligned to the image as illustrated in FIG. 13B.

Figures 14A, 14B:
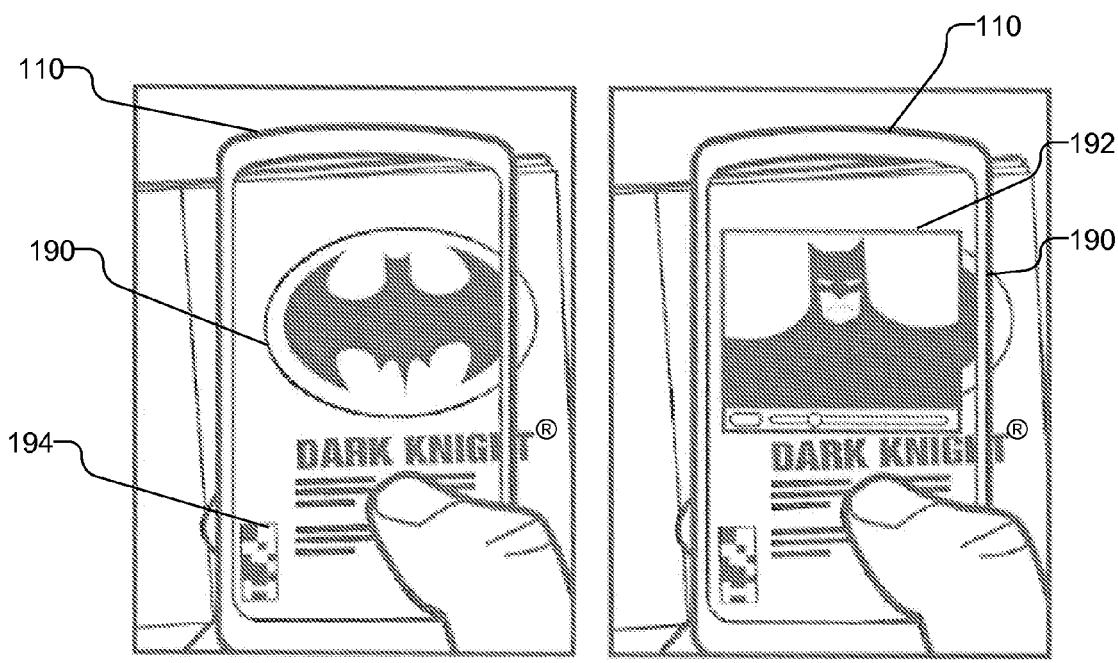
FIGS. 14A and 14B illustrate another example of the master device imaging a passive object and retrieving and displaying information related to the passive object.

FIGS. 14A and 14B illustrate an example where the master device 110 images a passive object 190, such as an advertisement for a movie, and in this example as the Dark Knight® logo (FIG. 14A) and related data (192) to the Dark Knight® is retrieved and displayed. For example, the Dark Knight® movie may be automatically be retrieved and displayed on the master device 110 as shown in FIG. 14B. Alternatively, other information related to the imaged object may be displayed, such as locations and times that the Dark Knight® movie is showing. If desired, the image of the passive object 190 may be based on the visual appearance, e.g., the logo itself, or may be based partly or completely on a visual marker 194 to assist in the identification of the passive object.

Figures 15A, 15B, 15C:
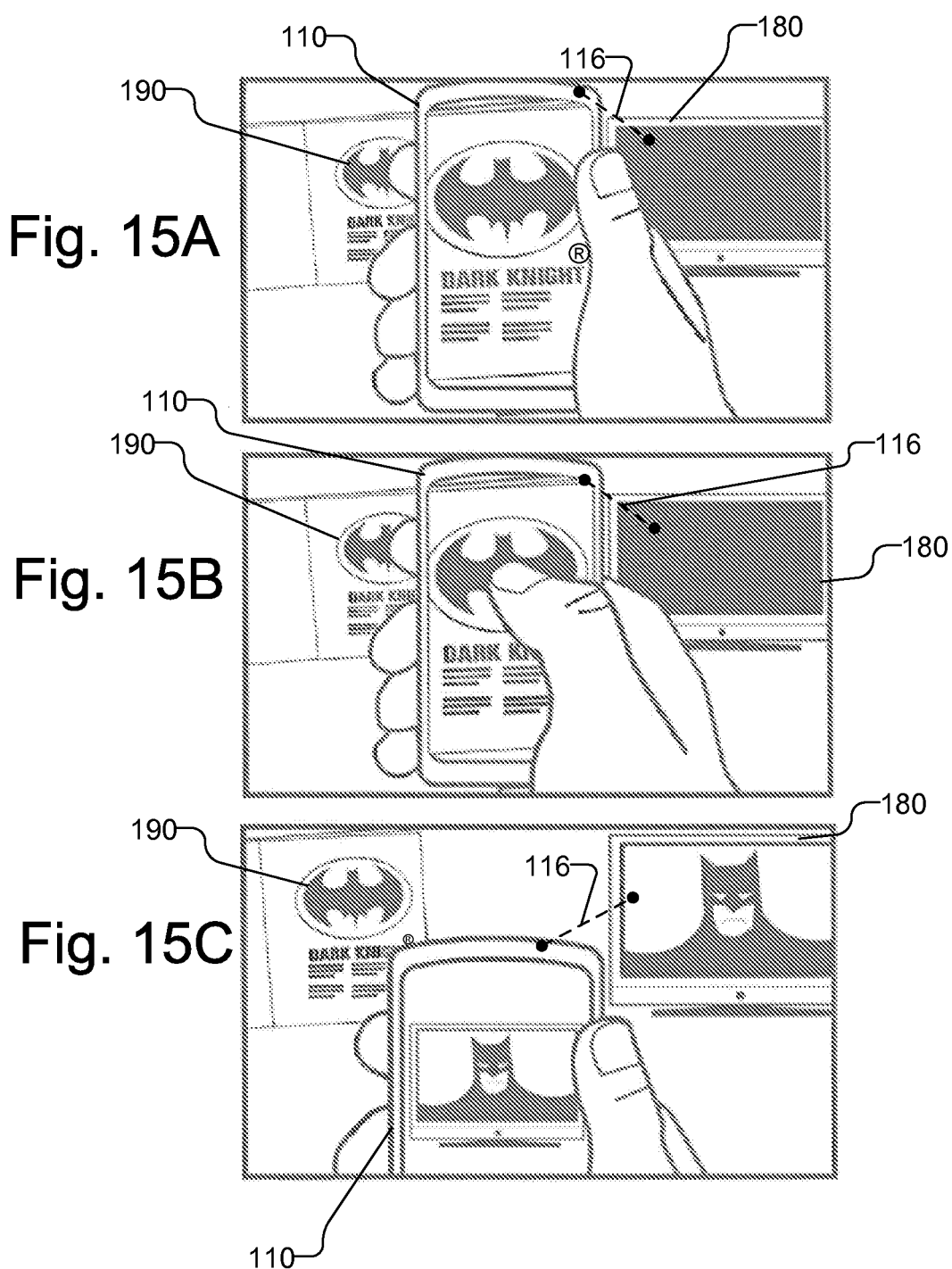
FIGS. 15A, 15B, and 15C illustrate a master device imaging a passive object, retrieving data related to the object and passing the data to an object device with which the master device is interfacing.

In another embodiment, the master device 110 may interface with a pairable object device 180 and provide data obtained from an image of another object device, which may be pairable or passive, to the object device 180. In one embodiment, there may be more than one object device from which the data is obtained and/or more than one target object device 180. For example, as illustrated in FIGS. 15A, 15B, and 15C, a master device 110 may image a passive object 190 (such as a Dark Knight® advertisement) (FIG. 15A) and identify and obtain data based on the image of the passive object as discussed above. The user may select data to be passed to a paired 116 target object device 180, such as a television (FIG. 15B) and the data, e.g., the movie, is automatically passed to the object device 180 (FIG. 15C). The data may be retrieved by the master device 110 and passed to the object device 180 or, alternatively, the master device 110 may provide instructions to the object device 180 to retrieve the data itself.

Thus, the master device 110 may be used to pass commands to object device 180 based on the image of one or more object devices, passive or pairable. For example, the master device 110 may image a specific brand of running shoes, then image an mp3 player and in response automatically download a specific playlist, e.g., exercise music, to the mp3 player. In one embodiment, the master device 110 downloads the data, e.g., music, and passes the data to the object device, or alternatively, instructs the object device to retrieve the data itself. For multi-selections, the camera may be pointed at the objects for a short period of time, or the user may interact with the image, e.g., by pressing or holding a button, or using a gesture to indicate to start or stop a multi-selection. The user may select the object devices in the images, the object devices may be selected automatically, or the user may select the object devices once, and subsequent selection is automatic. The action that occurs in response to the multi-selection may be user defined or defined externally.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   imaging an object device with a master device and displaying the image of the object device on the master device;
   identifying the object device using the image of the object device;
   interfacing with the object device through the master device based on the identity of the object device; and
   displaying on the master device a user interface for the object device to control the object device with the master device, wherein the user interface for the object device to control the object device is displayed over the image of the object device on the master device.

2. The method of claim 1, further comprising displaying functionality exposed by the object device on the master device.

3. The method of claim 1, further comprising:
   identifying the object device as pairable using the image of the object device; and
   pairing the master device with the object device.

4. The method of claim 1, the method further comprising:
   interfacing with a target device through the master device;
   wherein interfacing with the object device comprises retrieving data from the object device; and
   passing the data to the target device.

5. The method of claim 1, further comprising:
   pairing the master device with the object device;
   pairing the master device with a second object device; and
   using the master device to pair the object device and the second object device.

6. The method of claim 1, further comprising:
   receiving broadcast data from the object device, the broadcast data including information about the visual appearance of the object device;
   wherein the object device is identified by comparing the image of the object device with the broadcast data from the object device.

7. The method of claim 6, wherein the information about the visual appearance of the object device comprises at least one of an image and a textured 3-dimensional model of the object device.

8. The method of claim 1, further comprising:
   receiving broadcast data from a plurality of object devices, the broadcast data including information about visual appearances of the plurality of object devices;
   wherein identifying the object device using the image of the object device comprises:
   filtering the broadcast data using the image of the object device to produce a subset of broadcast data;
   displaying the subset of broadcast data;
   identifying the object device by user selection from the displayed subset of broadcast data.

9. The method of claim 1, further comprising interfacing the object device with a wide area network through the master device.

10. A method comprising:
    receiving broadcast data from an object device, the broadcast data including information about a visual appearance of the object device, the visual appearance being a look of the object device;
    displaying the broadcast data on a master device; and
    interfacing with the object device based on a selection of the displayed broadcast data from the object device, displaying on the master device a user interface for the object device to control the object device with the master device, wherein the user interface for the object device to control the object device is displayed over the image of the object device on the master device.

11. The method of claim 10, further comprising:
imaging the object device with the master device; and
identifying the object device by comparing the image of the object device and the received broadcast data.

12. The method of claim 10, further comprising interfacing the object device with a wide area network through the master device.

13. An apparatus comprising:
a camera being operable to image an object device;
a wireless transceiver capable of transmitting and receiving wireless signals to and from the object device;
a processor connected to the camera and the wireless transceiver;
memory connected to the processor;
a digital display coupled to the processor; and
software held in the memory and run in the processor to cause the processor to identify the object device using an image provided by the camera, to interface with the identified object device through the wireless transceiver, and to display on the digital display a user interface for the object device to control the object device, wherein the software causes the processor to display the user interface for the object device to control the object device over the image of the object device that is displayed on the digital display.

14. The apparatus of claim 13, wherein functionality exposed by the object device is displayed on the digital display.

15. The apparatus of claim 14, wherein the functionality exposed by the object device is received by the wireless transceiver from the object device.

16. The apparatus of claim 14, the apparatus further comprising a network interface transceiver coupled to the processor, wherein the functionality exposed by the object device is received by the network interface transceiver.

17. The apparatus of claim 13, wherein the software causes the processor to identify the object device as pairable using the image of the object device; and pairing with the object device.

18. The apparatus of claim 13, wherein the software causes the processor to interface with a target device, to interface with the object device comprises retrieving data from the object device; and to transmit the data to the target device through the wireless transceiver.

19. The apparatus of claim 13, wherein the software causes the processor to pair with the object device, to pair with a second object device; and to pair the object device and the second object device.

20. The apparatus of claim 13, wherein the wireless transceiver receives broadcast data from the object device and provides the broadcast data to the processor, the broadcast data including information about the visual appearance of the object device, the software causes the processor to identify the object device by comparing the image provided by the camera with the broadcast data received from the object device.

21. The apparatus of claim 20, wherein the information about the visual appearance of the object device comprises at least one of an image and a textured 3-dimensional model of the object device.

22. The apparatus of claim 13, further comprising a digital display coupled to the processor and a user interface coupled to the processor, wherein the wireless transceiver receives broadcast data from a plurality of object devices and provides the broadcast data to the processor, the broadcast data including information about the visual appearances of the object devices, the software causes the processor to identify the object device by filtering the broadcast data using the image provided by the camera to produce a subset of broadcast data; to display the subset of broadcast data on the digital display and to identify the object device from the subset of broadcast data based on an input from the user interface.

23. The apparatus of claim 13, the apparatus further comprising a network interface transceiver coupled to the processor, wherein the software causes the processor to interface the object device with a wide area network through the network interface transceiver.

24. An apparatus comprising:
a wireless transceiver capable of transmitting and receiving wireless signals to and from the object device, the wireless transceiver receiving broadcast data from an object device, the broadcast data including information about a visual appearance of the object device, the visual appearance being a look of the object device;
a digital display;
a user interface;
a processor connected to the camera and the digital display and a user interface;
memory connected to the processor; and
software held in the memory and run in the processor to cause the processor to display the broadcast data on the digital display; and to interface with the object device based on an input from the user interface in response to the displayed broadcast data, and to display on the digital display a user interface for the object device to control the object device, wherein the software causes the processor to display the user interface for the object device to control the object device over the image of the object device that is displayed on the digital display.

25. The apparatus of claim 24, wherein the wireless transceiver receives broadcast data from a plurality of object devices, the apparatus further comprising a camera being operable to image the object device, the software causes the processor to compare the image of the object device with the received broadcast data and to filter the broadcast data using the image provided by the camera to produce a subset of broadcast data; to display the subset of broadcast data on the digital display.

26. The apparatus of claim 24, the apparatus further comprising a network interface transceiver coupled to the processor, wherein the software causes the processor to interface the object device with a wide area network through the network interface transceiver.

27. A system interfacing between a master device and an object device comprising:
means for imaging an object device with the master device;
means for displaying the image of the object device on the master device;
means for identifying the object device using the image of the object device;
means for interfacing with the identified object device; and
means for displaying a user interface for the identified object device to control the identified object with the master device, wherein the means for displaying the user interface for the object device to control the identified object device with the master device displays the user interface for the identified object device over the image of the object device.

28. The system of claim 27, further comprising means for obtaining functionality exposed by the object device, wherein the means for displaying the image of the object displays the functionality exposed by the object device.

29. The system of claim 27, wherein the means for interfacing pairs the master device with the object device.

30. The system of claim 27, wherein the means for interfacing with the identified object device further interfaces with a target device that is different than the object device; the system further comprising means for retrieving data from the identified object device; wherein the means for interfacing passes the retrieved data to the target device.

31. The system of claim 27, wherein the means for interfacing pairs the master device with the object device and pairs the master device with a second object device, the system further comprising means for pairing the object device with the second object device through the master device.

32. The system of claim 27, further comprising:
means for receiving broadcast data from the object device, the broadcast data including information about the visual appearance of the object device;
wherein the means for identifying the object device compares the image of the object device with the broadcast data from the object device.

33. The system of claim 32, wherein the information about the visual appearance of the object device comprises at least one of an image and a textured 3-dimensional model of the object device.

34. The system of claim 27, further comprising:
means for receiving broadcast data from a plurality of object devices, the broadcast data including information about the visual appearances of the object devices;
wherein the means for identifying the object device comprises:
means for filtering the broadcast data using the image of the object device to produce a subset of broadcast data, wherein the means for displaying displays the subset of broadcast data;
means for selecting the object device based on the displayed subset of broadcast data.

35. The system of claim 27, further comprising a means for interfacing the object device to a wide area network.

36. A non-transitory computer-readable medium including program code stored thereon, comprising:
program code to image an object device with a master device and displaying the image of the object device on the master device;
program code to identify the object device using the image of the object device;
program code to interface with the identified object device through the master device based on the identity of the object device; and
program code to display on the master device a user interface for the object device to control the object device, wherein the user interface for the object device to control the object device is displayed over the image of the object device on the master device.

* * * * *